(12) United States Patent
Boos

(10) Patent No.: US 9,984,298 B2
(45) Date of Patent: May 29, 2018

(54) METHOD FOR OUTPUTTING A DROWSINESS WARNING AND CONTROL UNIT

(71) Applicant: Robert Bosch GmbH, Stuttgart (DE)

(72) Inventor: Ronald Boos, Waiblingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days. days.

(21) Appl. No.: 15/349,798

(22) Filed: Nov. 11, 2016

(65) Prior Publication Data
US 2017/0177959 A1    Jun. 22, 2017

(30) Foreign Application Priority Data

Dec. 16, 2015  (DE) .................... 10 2015 225 427 U
Apr. 11, 2016  (DE) .................... 10 2016 205 996 U

(51) Int. Cl.
G08B 23/00    (2006.01)
G06K 9/00     (2006.01)
G08B 21/06    (2006.01)

(52) U.S. Cl.
CPC ......... G06K 9/00845 (2013.01); G08B 21/06 (2013.01)

(58) Field of Classification Search
CPC .............................. B60K 28/066; G08B 21/06
See application file for complete search history.

(56) References Cited

U.S. PATENT DOCUMENTS

| | | | | |
|---|---|---|---|---|
| 5,786,765 A * | 7/1998 | Kumakura | ............. | G08B 21/06 340/575 |
| 6,717,518 B1 * | 4/2004 | Pirim | ........................ | B60R 1/04 340/576 |
| 2004/0090334 A1 * | 5/2004 | Zhang | .................. | B60K 28/066 340/575 |
| 2012/0087541 A1 * | 4/2012 | Hiroshi | .............. | G06K 9/00845 382/103 |
| 2015/0213725 A1 * | 7/2015 | Huntley | ................. | A61B 5/168 345/156 |

* cited by examiner

*Primary Examiner* — Omeed Alizada
(74) *Attorney, Agent, or Firm* — Norton Rose Fulbright US LLP; Gerard Messina

(57) ABSTRACT

A method for outputting a drowsiness warning. In this method, a degree of drowsiness of a driver of a vehicle is initially read in. A display signal is subsequently generated as a function of the degree of drowsiness. The display signal includes a sequence of images as the drowsiness warning displayable via a display device of the vehicle and including at least one eye area of the driver.

7 Claims, 3 Drawing Sheets

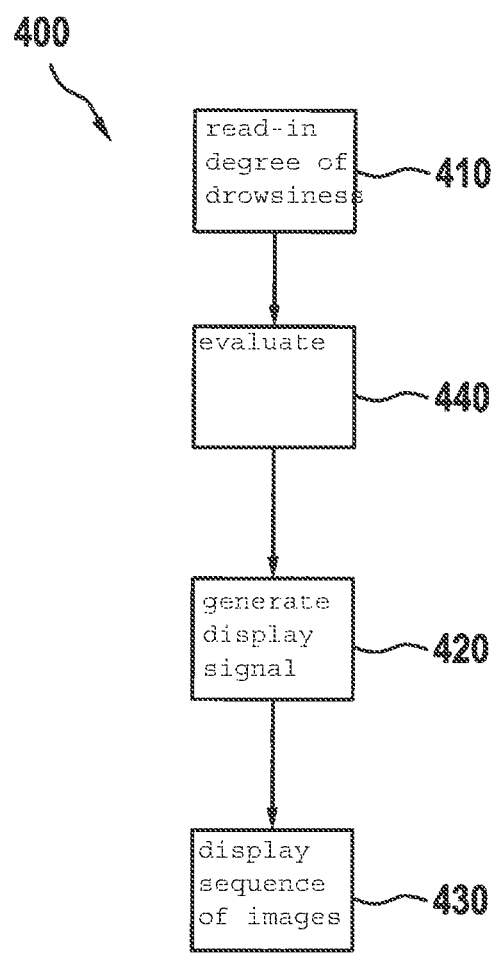

METHOD FOR OUTPUTTING A DROWSINESS WARNING AND CONTROL UNIT

CROSS REFERENCE

The present application claims the benefit under 35 U.S.C. § 119 of German Patent Application Nos. DE 102015225427.5 filed on Dec. 16, 2015, and DE 102016205996.3 filed on Apr. 11, 2016, each of which is expressly incorporated herein by reference in its entirety.

BACKGROUND INFORMATION

It is very important to be able to detect or predict the state of drowsiness of the driver of a vehicle. Fatigue limits the driving fitness to a degree similar to alcohol. A driver who is tired is unable to concentrate well, reacts slower and overestimates himself/herself. This may adversely affect the driving performance.

SUMMARY

Against this background, a method for outputting a drowsiness warning in accordance with the present invention is presented, in addition to a control unit, which uses this method and, finally, a corresponding computer program. Advantageous refinements and improvements of the device are described herein.

One example method for outputting a drowsiness warning is provided, the method including the following steps:

Reading in a degree of drowsiness of a driver of a vehicle; and generating a display signal using the degree of drowsiness, the display signal including an image sequence as the warning signal displayable via a display device of the vehicle and including at least one eye area of the driver.

The drowsiness warning may be outputted via a suitable display device, for example, to the driver, to another vehicle occupant or to a third person. The display device may be a device integrated into the vehicle or situated in the vehicle, also a mobile telephone of an occupant of the vehicle, for example.

The degree of drowsiness may be read in in the form of a signal or digital data via a read-in interface. The degree of drowsiness may be understood to mean, for example, a drowsiness index indicating the drowsiness of the driver. The degree of drowsiness may be ascertained, for example, on the basis of an eye closure rate, a degree of eye opening, a duration of eyelid closure or a specific eye movement of the driver. A display device may, for example, be understood to mean a central display, an instrument cluster or a head-up display of the vehicle. The display device in this case may, depending on the specific embodiment, be viewable by the driver or also by at least one other occupant of the vehicle. A sequence of images may be understood to mean a number of chronologically ordered images, in particular, a video sequence. An eye area of the driver may be understood to mean a part of the face of the driver including the eyes of the driver.

The approach described herein is based on the finding that a sequence of images, for example, a video sequence in the context of a video-based drowsiness detection or microsleep detection, for example, may be utilized as a warning to the driver. By displaying the video sequence, the driver is able to observe him/herself in order to see, for example, how long he/she closes his/her eyes, how slowly his/her eyelids move or how tired he/she appears. This has the advantage that he/she becomes more clearly conscious of the danger associated with his/her drowsiness and is more inclined to take a break from driving. Thus, with such a warning concept, the driver may be effectively moved to discontinue driving, so that the driver may arrive safely at his/her destination and accidents may be reduced.

The method may include a step of selecting the sequence of images from an image sequence, which represents a sequence detected by a driver observation camera. A driver observation camera in this case may be understood to mean an image detection device, which includes a detection zone which captures the eye area of the driver during driving. The image sequence may be understood to mean an instantaneously detected image sequence or a saved image sequence. Thus, the method may include a step of reading in the image sequence via an interface to the driver observation camera or to a memory unit. The method may also include a step of recording the image sequence including at least the eye area. The sequence of images may be selected from the sequence in the step of selecting, for example, as a function of an eye closure rate, a degree of eye opening, a duration of eyelid closure, a turning away of the eyes or a yawning of the driver. By using the image sequence, it is possible to implement a very realistic drowsiness warning.

According to one specific embodiment, a signal provided using a driver observation camera of the vehicle or a lane-keeping assistant of the vehicle or a steering angle of the vehicle may be read in as the degree of drowsiness in the step of reading in. The degree of drowsiness may, for example, represent a signal derived from a recording of the driver observation camera or from the steering angle or from a position of the vehicle within the traffic lane. This specific embodiment enables a reliable and precise evaluation of the drowsiness of the driver.

According to another specific embodiment, the method may include a step of displaying the sequence of images via the display device using the display signal. The sequence of images in this case may be displayed to the driver. Alternatively or in addition, the sequence of images may also be displayed to at least one other occupant of the vehicle, in particular, for example, a front seat passenger. With this specific embodiment, the sequence of images may be played back to the driver or to the other occupant.

It is advantageous if the degree of drowsiness is evaluated in a step of evaluating. In this case, the display signal may be generated in the step of generating as a function of a result of evaluating. The display signal may be generated, for example, if the result reveals that the degree of drowsiness indicates a microsleep of the driver. In addition or alternatively, the display signal may be generated if the result reveals that the degree of drowsiness exceeds a predetermined limit value. The limit value may, for example, be a specific eyelid closure frequency or a specific degree of eye opening. In this way, it is possible to increase the reliability of the method.

According to another specific embodiment, the method may include a step of providing a visual warning signal and/or acoustic warning signal and/or haptic warning signal for warning the driver of drowsiness as a function of the degree of drowsiness. This may further improve the effectiveness of the drowsiness warning. Thus, the method may be integrated into systems, which ascertain the drowsiness of the driver based, for example, on a steering angle of the vehicle or with the aid of lane-keeping sensors, or which detect the drowsiness via an eye closure and which output a corresponding warning in response. The warning may invite the driver, for example, symbolically, by displaying a coffee cup, for example, to take a break.

It is advantageous if the step of generating is carried out sequentially after the step of providing. In this way, the driver may be warned of drowsiness in two different warning stages.

The warning signal may be provided in the step of providing, for example, if it is revealed in the step of evaluating that the degree of drowsiness indicates microsleep or exceeds the limit value. Following the step of providing, the step of reading in may be carried out again, in order to read in an additional degree of drowsiness of the driver. Accordingly, the step of evaluating may be carried out again in order to evaluate the additional degree of drowsiness. Finally, the display signal may be generated in the step of generating, if it is revealed in the step of evaluating that the additional degree of drowsiness indicates microsleep or exceeds the limit value.

This method may be implemented, for example, in software or hardware or in a hybrid combination of software and hardware, for example, in a control unit.

The approach presented herein also provides a control unit, which is designed to carry out, control, or implement the steps of a variant of a method presented herein in corresponding devices. With this specific embodiment variant of the present invention in the form of a control unit as well, it is possible to quickly and efficiently achieve the object underlying the present invention. Such a control unit may, in particular, include a read-in unit for reading in the cited degree of drowsiness of the driver and a generating unit for generating the cited display signal using the degree of drowsiness.

For this purpose, the control unit may include at least one computing unit for processing signals or data, at least one memory unit for storing signals or data, at least one interface to a sensor or an actuator for reading in sensor signals of the sensor or for outputting control signals to the actuator and/or at least one communication interface for reading in or outputting data, which are embedded in a communication protocol. The computing unit may, for example, be a signal processor, a microcontroller or the like, the memory unit capable of being a flash memory, an EPROM or a magnetic memory unit. The communication interface may be designed to read in or output data in a wireless and/or wire-bound manner, a communication interface being capable of reading in or outputting the wire-bound data, being capable of reading in these data, for example, electrically or visually from a corresponding data transmission line or outputting them into a corresponding data transmission line.

In one advantageous embodiment, the control unit controls a central display, an instrument cluster or a head-up display of a vehicle. For this purpose, the control unit may, for example, access sensor signals of a driver observation camera, of a steering angle sensor or of a lane-keeping assistant.

Also advantageous is a computer program product or computer program having program code, which may be stored on a machine-readable carrier or memory medium, such as a semiconductor memory, a hard disk memory or an optical memory, and which is used for carrying out, implementing and/or controlling the steps of the method according to one of the previously described specific embodiments, in particular, when the program product or program is executed on a computer or a device.

Exemplary embodiments of the present invention are shown in the figures and described in greater detail below.

BRIEF DESCRIPTION OF THE DRAWINGS

FIG. 4 shows a flow chart of a method according to one exemplary embodiment.

DETAILED DESCRIPTION OF EXAMPLE EMBODIMENTS

Figure 1:
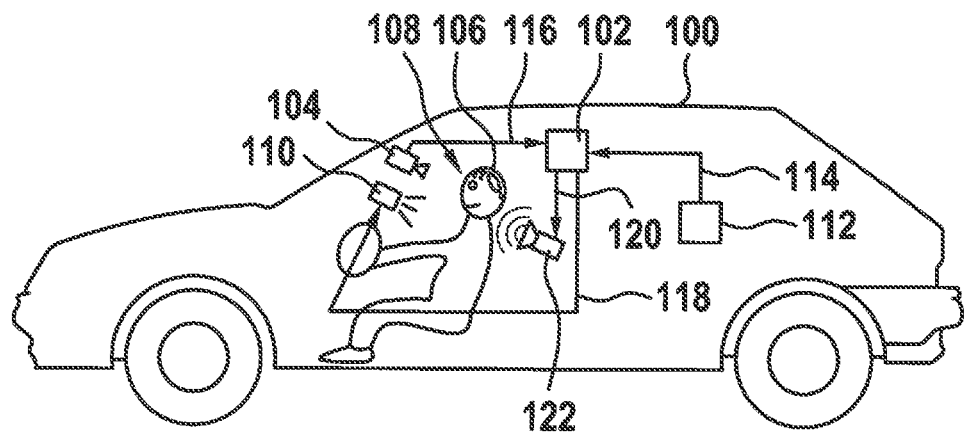
FIG. 1 schematically shows a depiction of a vehicle having a control unit according to one exemplary embodiment.

In the following description of advantageous exemplary embodiments of the present invention, identical or similar reference numerals are used for elements which are depicted in the various figures and act similarly, a repeated description of these elements being omitted.

FIG. 1 schematically shows a depiction of a vehicle 100 having a control unit 102 according to one exemplary embodiment. Vehicle 100 includes a driver observation camera 104 for detecting a driver 106 of vehicle 100, in particular an eye area 108 of driver 106, as well as a display device 110 for displaying information, for example, in the field of vision of driver 106. Display device 110 is, for example, a central display, an instrument cluster or a head-up display or also a mobile device situated in vehicle 100 such as, for example, a smartphone. Control device 102 is connected or coupled to both driver observation camera 104 and display device 110. Control device 102 is also connected to a drowsiness ascertainment unit 112, which is designed to ascertain a degree of drowsiness 114 representing a drowsiness of driver 106, and to send a corresponding signal to control device 102. Depending on the exemplary embodiment, drowsiness ascertainment unit 112 is designed to ascertain degree of drowsiness 114 using a signal provided by driver observation camera 104 or by a lane-keeping assistant of vehicle 100 or on the basis of a steering angle of vehicle 100. Drowsiness ascertainment unit 112 may be implemented as a unit separate from control unit 102, as shown by way of example in FIG. 1. Alternatively, drowsiness ascertainment unit 112 may also be implemented as a component of control unit 102 or driver observation camera 104.

Driver observation camera 104 is designed to record a sequence of images 116 of eye area 108 and to transmit this to control unit 102. Control unit 102 is designed to generate a display signal 118 as a function of degree of drowsiness 114, which includes sequence of images 116, for example. Display device 110 is designed to reproduce sequence of images 116 using display signal 118 so that driver 106 is able to observe him/herself in display unit 110.

Display signal 118 is generated by control unit 102, for example, if an evaluation of degree of drowsiness 114 by control unit 102 reveals that the drowsiness of driver 106 suggests a microsleep or degree of drowsiness 114 exceeds a predetermined limit value.

Depending on the exemplary embodiment, driver observation camera 104 records eye area 108 continuously or at specific intervals. Driver observation camera 104 is designed, for example, to record a continuous image sequence with a sequence of individual images and to transmit this image sequence to control unit 102. Accordingly, control unit 102 may be designed to select sequence of images 116 from the image sequence as a function of degree of drowsiness 114.

According to this exemplary embodiment, control unit 102 is designed to generate, in addition to display signal 118, an optional warning signal 120, in this case, an acoustic signal, as a function of degree of drowsiness 114, and to send this to a corresponding reproduction unit 122, in this case, a loud speaker in vehicle 100. Reproduction unit 122 is designed to output a warning to driver 106 using warning signal 120, for example, a warning tone or a warning message, in order to warn driver 106 of his/her drowsiness. Depending on the exemplary embodiment, warning signal 120 may also be a visual signal or a haptic signal or a combination of various warning signals. The following warning options are possible, for example. Driver 106 may be warned, for example, via a visual feedback in the form of a color-coded status display, also called alertometer, of a coffee cup or of a warning triangle. In addition or alternatively, a warning via a haptic feedback is also possible, for example, by vibration of a safety belt, by a pressure pulse on the palms of driver 106 or by steering wheel vibration or seat vibration. An olfactory warning via a suitable device for giving off a fragrance, for example, by giving off a peppermint fragrance, is also possible.

According to one exemplary embodiment, the warning of driver 106 is triggered by an output signal of a driver model function "drowsiness and/or microsleep" based on driver observation camera 104. Alternatively, an output of a drowsiness detection is used based on the steering angle of vehicle 100 or a lane-keeping signal of the lane-keeping assistant. If a microsleep is detected or if, in addition or alternatively, the degree of drowsiness is above a specific threshold limit, a previous video sequence, for example, is displayed via display device 110 to driver 106 or to another occupant of the vehicle. If it is not possible to access past video sequences, a next possible event having drowsiness-related features is played back, for example, or, in the simplest case, a subsequent video sequence. A drowsiness-related feature may, for example, be a slow rate of eye closure, a low degree of eye opening, an eyelid closure duration, a turning away of the eyes or a yawning. Depending on the exemplary embodiment, the video sequences may include an entire part of the face of driver 106 or only eye area 108. Alternatively, a classic warning in the form of warning signal 120, for example, a warning symbol in the shape of a coffee cup or an acoustic warning may be output to driver 106, either by reproduction unit 122 or display device 110 or both devices prior to displaying the video sequence. If driver 106 initiates no countermeasure in response, i.e., there is no stop for a break or no switch of drivers takes place, the video sequence may be displayed to driver 106 as a second warning stage following the reproduction of warning signal 120. A schematic sequence is described below with reference to FIG. 3.

Figure 2:
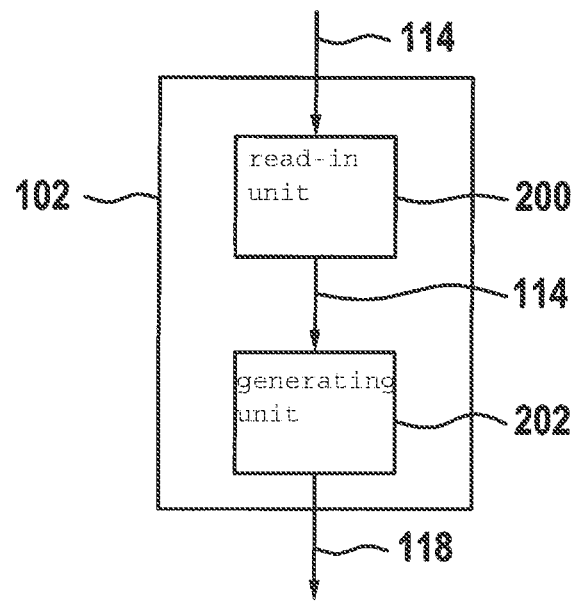
FIG. 2 schematically shows a depiction of a control unit according to one exemplary embodiment.

FIG. 2 schematically shows a depiction of a control unit 102 according to one exemplary embodiment. Control unit 102 is a control unit described above with reference to FIG. 1, for example. Control unit 102 includes a read-in unit 200 for reading in degree of drowsiness 114, and a generating unit 202 for generating display signal 118 as a function of degree of drowsiness 114. Units 200, 202 of control unit 102 are designed, for example, to implement the steps of the method described with reference to FIG. 4.

Figure 3:
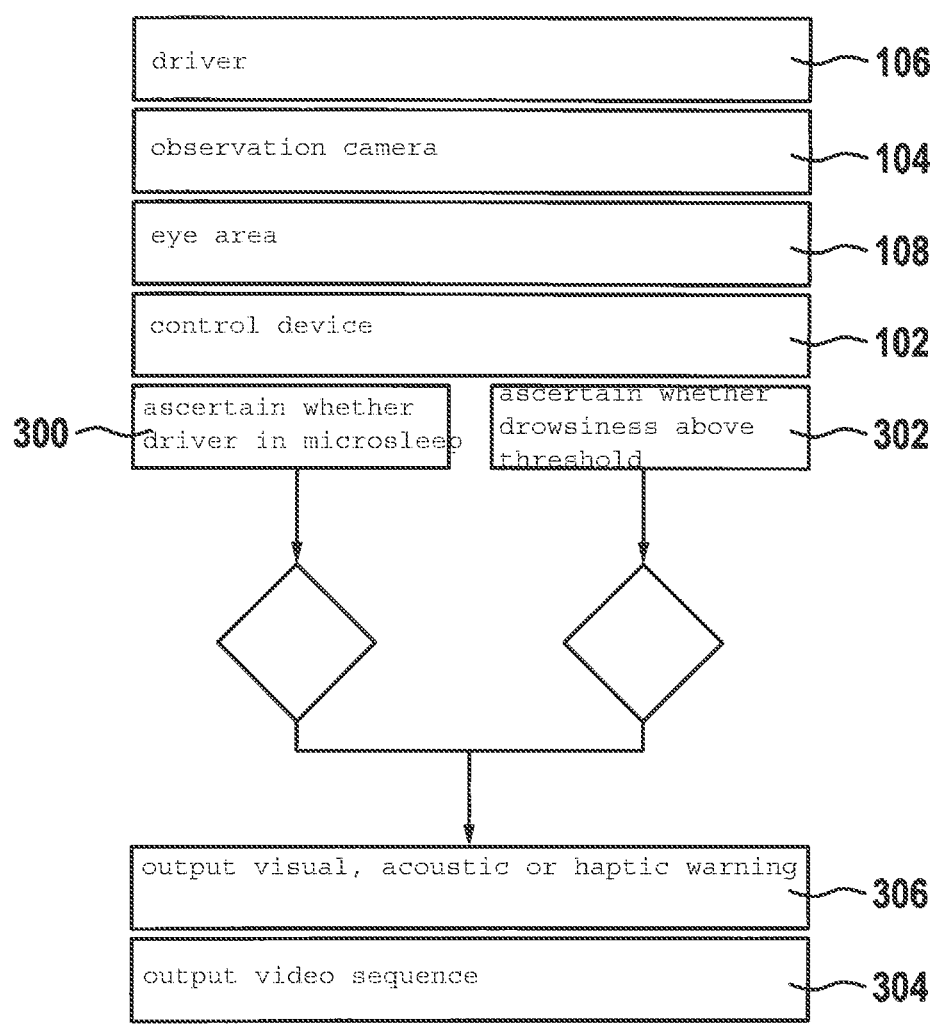
FIG. 3 shows a block diagram of a method according to one exemplary embodiment.

FIG. 3 shows a block diagram of a method for outputting a drowsiness warning, for example, to a driver 106 of a vehicle according to one exemplary embodiment. Driver 106, driver observation camera 104, which is designed to detect a part of the face of driver 106, at least eye area 108, and a computing unit as control unit 102 as it has also been previously described with reference to FIG. 1, are schematically shown. Control unit 102 is designed to ascertain in a step 300 whether driver 106 is in a microsleep, and to ascertain in a step 302 whether a drowsiness index assigned to driver 106, previously also referred to as degree of drowsiness, is above a predefined threshold. If driver 106 is in a microsleep or the drowsiness index is above the threshold, a video sequence with drowsiness features exemplifying microsleep is displayed in a step 304 on the display device, for example, on the central display, the instrument cluster or the head-up display of the vehicle. In an optional step 306 preceding step 304 in time, a visual warning, acoustic warning or haptic warning is also outputted.

FIG. 4 shows a flow chart of a method 400 for outputting a drowsiness warning according to one exemplary embodiment. Method 400 may be carried out, for example, by a control unit previously described with reference to FIGS. 1 through 3. In this case, a degree of drowsiness of the driver is read in in a step 410. In a further step 420, a display signal for warning the driver or one other vehicle occupant of the drowsiness of the driver is generated as a function of degree of drowsiness. The display signal is displayable to the driver and/or to one other vehicle occupant via a display device of the vehicle and includes a sequence of images depicting at least one eye area of the driver as a drowsiness warning.

If the sequence of images is not already present, the sequence of images may be selected from an image sequence in step of generating 420. The sequence of images according to one exemplary embodiment is initially read in in step 420 from a memory device or via an interface to a driver observation camera and represents a sequence of images of the eye area of the driver detected instantaneously or previously by the driver observation camera.

According to one exemplary embodiment, method 400 includes an optional step 430, in which the sequence of images is displayed via the display device. In this case, the sequence of images, depending on the exemplary embodiment, is displayed to the driver or also to other occupants of the vehicle, for example, a front seat passenger.

According to another exemplary embodiment, the degree of drowsiness, after being read in, is evaluated in an optional step 440. The display signal in this case is generated in step 420, if it is revealed in step 440 that the degree of drowsiness indicates a microsleep of the driver or, in addition or alternatively, exceeds a predetermined limit value.

If an exemplary embodiment includes an "and/or" linkage between a first feature and a second feature, this is to be read in the sense that the exemplary embodiment according to one specific embodiment includes both the first feature and the second feature, and according to another specific embodiment, either only the first feature or only the second feature.

What is claimed is:

1. A method for outputting a drowsiness warning, the method comprising:
reading in a degree of drowsiness of a driver of a vehicle; and
generating a display signal using the degree of drowsiness, the display signal including a sequence of images as the drowsiness warning displayable via a display device, the sequence of images including a sequence of images of at least one eye area of the driver;

wherein in the generating step, the sequence of images of the eye area of the driver is selected, as a function of the degree of drowsiness of the driver, from an image sequence detected by a driver observation camera; and
displaying the sequence of images of the eye area of the driver on a display device in the vehicle using the display signal;
wherein the sequence of images of the eye area of the driver is a video sequence of the eye area of the driver.

2. The method as recited in claim 1, wherein in the reading in step, at least one of: i) a signal provided using at least one of a driver observation camera of the vehicle and a lane-keeping assistant of the vehicle, and ii) a steering angle of the vehicle, is read in as the degree of drowsiness.

3. The method as recited in claim 1, further comprising: evaluating the degree of drowsiness,
wherein in the step of generating, the display signal is generated as a function of a result of the evaluation.

4. The method as recited in claim 1, further comprising: providing at least one of: i) a visual warning signal, ii) an acoustic warning signal, and iii) a haptic warning signal, for warning the driver of the drowsiness as a function of the degree of drowsiness.

5. The method as recited in claim 4, in which the generating step is carried out subsequent to the providing step.

6. A control unit designed to:
read in a degree of drowsiness of a driver of a vehicle; and
generate a display signal using the degree of drowsiness, the display signal including a sequence of images as the drowsiness warning displayable via a display device, the sequence of images including a sequence of images of at least one eye area of the driver;
wherein the sequence of images of the eye area of the driver are selected, as a function of the degree of drowsiness of the driver, from an image sequence detected by a driver observation camera; and
wherein the control unit is designed to display the sequence of images of the eye area of the driver on a display device in the vehicle using the display signal;
wherein the sequence of images of the eye area of the driver is a video sequence of the eye area of the driver.

7. A non-transitory machine-readable memory medium on which is stored a computer program for outputting a drowsiness warning, the computer program, when executed by a processor, causing the processor to perform:
reading in a degree of drowsiness of a driver of a vehicle; and
generating a display signal using the degree of drowsiness, the display signal including a sequence of images as the drowsiness warning displayable via a display device, the sequence of images including a sequence of images of at least one eye area of the driver;
wherein in the generating step, the sequence of images of the eye area of the driver is selected, as a function of the degree of drowsiness of the driver, from an image sequence detected by a driver observation camera; and
displaying the sequence of images of the eye area of the driver on a display device in the vehicle using the display signal;
wherein the sequence of images of the eye area of the driver is a video sequence of the eye area of the driver.

* * * * *